(12) United States Patent
Hofmann et al.

(10) Patent No.: US 11,014,300 B2
(45) Date of Patent: May 25, 2021

(54) APPARATUS FOR ADDITIVELY MANUFACTURING OF THREE-DIMENSIONAL OBJECTS

(71) Applicant: CONCEPT LASER GMBH, Lichtenfels (DE)

(72) Inventors: Alexander Hofmann, Weismain (DE); Daniel Winiarski, Bad Staffelstein (DE); Jens Stammberger, Rödental (DE)

(73) Assignee: CONCEPT LASER GMBH, Lichtenfels (DE)

( * ) Notice: Subject to any disclaimer, the term of this patent is extended or adjusted under 35 U.S.C. 154(b) by 51 days.

(21) Appl. No.: 16/046,921

(22) Filed: Jul. 26, 2018

(65) Prior Publication Data
US 2019/0039307 A1 Feb. 7, 2019

(30) Foreign Application Priority Data
Aug. 4, 2017 (EP) ..................... 17185013

(51) Int. Cl.
*B29C 64/255* (2017.01)
*B29C 64/153* (2017.01)
(Continued)

(52) U.S. Cl.
CPC ............ *B29C 64/255* (2017.08); *B22F 10/00* (2021.01); *B29C 64/153* (2017.08); *B29C 64/20* (2017.08);
(Continued)

(58) Field of Classification Search
CPC ........................ B29C 64/255; B22F 2003/1056
See application file for complete search history.

(56) References Cited

U.S. PATENT DOCUMENTS

| 7,614,866 B2 | 11/2009 | Sperry et al. |
| 8,845,319 B2 | 9/2014 | Oberhofer et al. |

(Continued)

FOREIGN PATENT DOCUMENTS

| CN | 101229685 A | 7/2008 |
| CN | 102917862 A | 2/2013 |

(Continued)

OTHER PUBLICATIONS

European Search Report Corresponding to Application No. 17185013 dated Feb. 8, 2018.

(Continued)

*Primary Examiner* — Jacob T Minskey
*Assistant Examiner* — Virak Nguon
(74) *Attorney, Agent, or Firm* — Dority & Manning, P.A,

(57) ABSTRACT

Apparatus (1, 23, 27, 30) for additively manufacturing of three-dimensional objects (2) by means of successive layerwise selective irradiation and consolidation of layers of a build material (3) which can be consolidated by means of an energy beam, whereby the apparatus (1, 23, 27, 30) comprises at least one process chamber (4) with at least one chamber separation device (5, 24, 28, 31) separating a process region (6) into a first sub-region (7) and a second sub-region (8) of the process chamber (4), wherein the chamber separation device (5, 24, 28, 31) comprises at least one separation element (9, 29, 31) that is moveable and/or deformable, wherein the separation element (9, 29, 31) is configured to create a passageway (18) between the first and the second sub-region (7, 8) for at least one tool carrier (19).

19 Claims, 4 Drawing Sheets

Figure 1:
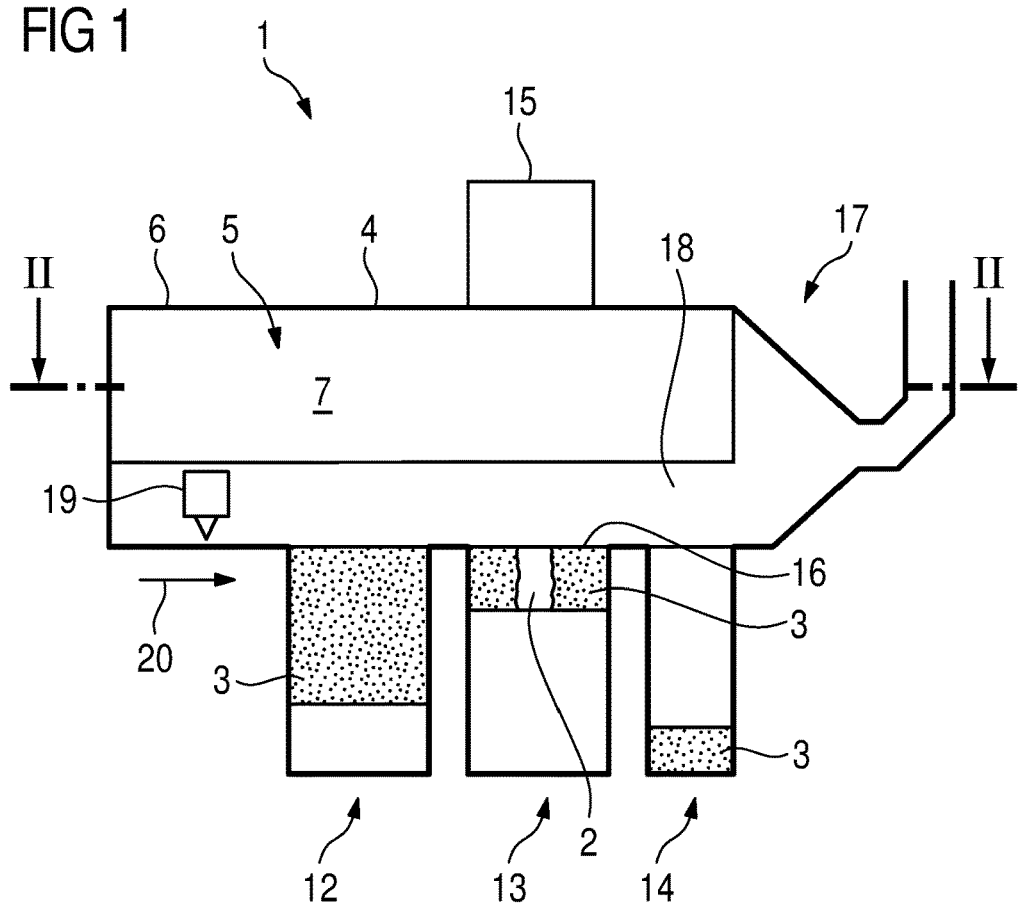

(51) Int. Cl.
    *B33Y 30/00*     (2015.01)
    *B29C 64/20*     (2017.01)
    *B22F 10/00*     (2021.01)
    *B29C 64/364*     (2017.01)
    *B22F 10/10*     (2021.01)

(52) U.S. Cl.
    CPC ............... *B33Y 30/00* (2014.12); *B22F 10/10* (2021.01); *B29C 64/364* (2017.08)

(56) References Cited

U.S. PATENT DOCUMENTS

| | | | |
|---|---|---|---|
| 1,036,962 A1 | 8/2019 | Yoshimura | |
| 2005/0263933 A1* | 12/2005 | Welch, IV | B33Y 30/00 264/113 |
| 2006/0192322 A1* | 8/2006 | Abe | B22F 3/1055 264/497 |
| 2015/0306666 A1* | 10/2015 | Honda | B22F 3/1055 425/78 |
| 2015/0314389 A1 | 11/2015 | Yamada | |
| 2016/0101469 A1 | 4/2016 | Kawada et al. | |
| 2017/0050278 A1* | 2/2017 | Jaster | B23Q 1/017 |
| 2018/0015541 A1* | 1/2018 | Amaya | B29C 64/20 |
| 2019/0262901 A1* | 8/2019 | Huebinger | B22F 3/1055 |
| 2019/0315050 A1* | 10/2019 | Dueformantel | B29C 64/30 |

FOREIGN PATENT DOCUMENTS

| | | | |
|---|---|---|---|
| CN | 106132597 A | 11/2016 | |
| CN | 106623931 A | 5/2017 | |
| DE | 102010052206 A1 * | 5/2012 | ............. B33Y 40/00 |
| EP | 2926927 A2 | 10/2015 | |
| EP | 3112056 A1 | 1/2017 | |
| JP | 2008/201127 A | 9/2008 | |
| JP | 2013/526429 A | 6/2013 | |

OTHER PUBLICATIONS

Machine Translated Japanese Office Action Corresponding to Application No. 2018004151 dated Jan. 16, 2019.
Machine Translated Chinese Search Report Corresponding to Application No. 201710864249 dated Jun. 22, 2020.

* cited by examiner

APPARATUS FOR ADDITIVELY MANUFACTURING OF THREE-DIMENSIONAL OBJECTS

CROSS-REFERENCE TO RELATED APPLICATIONS

This application claims priority to European Patent Application serial no. 17 185 013.4 filed Aug. 4, 2017, the contents of which is incorporated herein by reference in its entirety as if set forth verbatim.

The invention relates to an apparatus for additively manufacturing of three-dimensional objects by means of successive layerwise selective irradiation and consolidation of layers of the build material which can be consolidated by means of an energy beam, whereby the apparatus comprises at least one process chamber with at least one chamber separation device separating a process region into a first sub-region and a second sub-region of the process chamber.

Such apparatuses for additively manufacturing of three-dimensional objects, wherein a build material is consolidated in a process chamber by means of an energy beam are known from prior art. The build material is selectively irradiated by the energy beam and thereby selectively consolidated. To assure constant process parameters, the atmosphere in the process chamber is typically, filled with a process gas, in particular an inert gas, for example argon. Due to the irradiation of the build material by the energy beam residues, i.e. smoke, smolder, etc., emerge.

The residues transported within the process gas need to be guided off the process region. Further, it is known from prior art, that the efficiency in guiding off residues produced by consolidating the build material depends, inter alia, on the size/volume of the process chamber. Therefore, it has been suggested to use a chamber separation device that, at least partly, separates the process region into a first sub-region and a second sub-region to reduce the volume and to merely create a stream of process gas in one of the sub-regions.

The separation of the process chamber into sub-regions is possible only to a limited extent, since at least the sub-region containing a build plane, in which the build material is consolidated by the energy beam, should be open and/or accessible e.g. for a tool carrier carrying e.g. a coater. For instance, a tool carrier carrying a coater has to be moved through the process region to layerwise convey fresh build material to the build plane. Therefore, the process chamber cannot be separated entirely and the volumes of the single sub-regions are in process gas exchange.

It is therefore, an object of the present invention to provide an apparatus for additively manufacturing of three-dimensional objects, wherein the separation of sub-regions is improved.

The object is inventively achieved by an apparatus according to claim 1.

The apparatus described herein is an apparatus for additively manufacturing three-dimensional objects, e.g. technical components, by means of successive layerwise selective irradiation and consolidation of layers of a powdered build material ("build material") which can be consolidated by means of an energy beam. A respective build material can be a metal, ceramic or polymer powder. A respective energy beam can be a laser beam or an electronic beam. A respective apparatus can be a selective laser sintering apparatus, a selective laser melting apparatus or a selective electron beam melting apparatus, for instance.

The apparatus comprises a number of functional units which are used during its operation. Exemplary functional units are a process chamber, an irradiation device which is configured to selectively irradiate a build material layer disposed in the process chamber with at least one energy beam, and a stream generating device which is configured to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

The invention is based on the idea that the chamber separation device comprises at least one separation element that is movable and/or deformable, wherein the separation element is configured to create a passageway between the first and the second sub-region for at least one tool carrier. Therefore, the chamber separation device is not only a static device separating the process chamber at least partly into sub-regions, but comprises at least one separation element that is movable and/or deformable. By means of the movable and/or deformable separation element, the process region inside the process chamber can be divided into a first and a second sub-region. The process region according to the present invention is a region in which the manufacturing process is executed. For example, a dose module, a build module and an overflow module are located inside the process region, wherein a coater may convey fresh build material from the dose module to a build plane of the build module and excess build material is conveyed to the overflow module. The movable and/or deformable separation element is preferably movable between at least a first and a second position, wherein the separation element creates a passageway between the first and the second sub-region which can be passed by the at least one tool carrier.

Therefore, the passageway between the both sub-regions can be opened or closed dependent on the orientation and/or position of the separation element. The passageway between the both sub-regions can therefore, be closed and/or sealed and only needs to be opened for the tool carrier to pass the passageway or to allow for the tool carrier to be moved in both sub-regions. Thus, the separation of the process region into sub-regions is improved, since the volumes of the first and the second sub-region are separated from each other whenever the separation element is in the "closed" position. If the tool carrier needs to pass the passageway, the separation element can be moved in the "open" position and/or be deformed, thereby creating or opening the passageway, so that the tool carrier can pass or enter the other sub-region. Afterwards, the separation element can be moved and/or a deformed into the initial or "closed" position, in which the passageway is closed and/or sealed.

Particularly preferred, the passageway is closed and/or sealed while the energy beam, which may be an electron or a laser beam, selectively irradiates the build material. By separating the sub-regions while selectively irradiating the build material, it can be assured that the residues created by irradiating and/or consolidating the build material can be guided off in an improved manner, since the volume of the sub-region of the process region in which the build material is selectively irradiated is smaller compared to the whole process region. Therefore, a stream of process gas used to guide off the residues can be used more effectively and efficiently, respectively.

According to a preferred embodiment, the separation element is movable and/or deformable with respect to a position and/or a movement of the tool carrier, in particular a carrier for a coater. This embodiment suggests to move and/or to deform the separation element depending on the position and/or a movement of the tool carrier. This allows for a separation of the sub-regions whenever the tool carrier is not in the passageway or does not reach into the other sub-region through the passageway.

In particular, the tool carrier may carry a coater, wherein the coater is used to deploy fresh build material on the build plane on which the build material can be selectively irradiated by the energy beam. The build plane is therefore, part of the process region. Thereby, the tool carrier is moved through the process region and passes the passageway after deploying the build material on the build plane. Preferably, the tool carrier is returned to its initial position through, for example, the second sub-region while the energy beam selectively irradiates the build material in the first sub-region. Depending on the actual position of the tool carrier, the separation element is moved and/or deformed so as to open or close the passageway. Particularly preferred, the passageway can remain closed and therefore, the volume of the first sub-region can be reduced while the energy beam selectively irradiates the build material and thereby, creates residues that can be guided off more efficiently by a stream of process gas compared to creating the stream of process gas in the whole process region.

According to another preferred embodiment, the at least one separation element is movable between two positions, whereby an opening or a passageway in the chamber separation device is open in the first position and closed in the second position. The movement and/or deforming of the separation element between the two positions preferably depends on the position and/or the movement of the tool carrier. In the second position the separation element closes and/or seals the passageway, separating the sub-regions. Whenever the tool carrier needs to be moved through the passageway the separation element can be brought into the first position, in which the passageway is opened allowing for the tool carrier to be moved or reach through the passageway.

Further, the apparatus can be improved in that the chamber separation device provides a consistent surface facing the process region with the separation element in the second position. While the separation element is in the second position, the separation device and the separation element provide a typically consistent surface positively affecting the stream of process gas inside the process region. By providing the consistent surface it can be assured that the separation device and the separation element build no edge and no dead space in the process region.

Particularly preferred, the at least one separation element of the apparatus is vertically movable or movable under a defined angle to the perpendicular (vertical axis) between the first and the second position. Therefore, the space requirements for the movement and/or the deformation of the separation element can be reduced, as the separation element can be moved vertically, for example along a surface of the chamber separation device.

Further, it is possible, to move the separation element under a predefined angle to allow for a positioning of the separation element in line with a surface of the chamber separation device. This additionally, positively affects the provision of a consistent surface in the first sub-region to improve the stream of process gas. For example, the angle under which the separation element is moved to the perpendicular attains a value between 0° and 15°, more preferably between 5° and 10°, in particular 7°.

Another preferred embodiment of the apparatus suggests a streaming device configured to create a stream of process gas in the first sub-region, wherein at least one separation element separates the first sub-region from the second sub-region, whereby the stream of process gas in the first sub-region is separated from the second sub-region. Therefore, the first and the second sub-region are separated from each other while the separation element is in the second position. In the second position the passageway for the tool carrier is closed and therefore, there is no exchange of process gas between the sub-regions. The streaming device can therefore, create a stream of process gas only in the first sub-region, wherein the process gas in the second sub-region is not affected by the streaming device allowing for a more efficient use of the streaming device, since only the volume of process gas inside the first sub-region has to be conveyed.

According to this embodiment, it is further particularly preferred that the first sub-region extends substantially along a build plane, in particular from a first side of a dose module facing a build chamber to a second side of an overflow module facing away from the build chamber. The preferred embodiment of the inventive apparatus therefore, suggests to only extend the separation of the first sub-region and the second sub-region over an area in which a specific stream of process gas can be expected. The streaming device is, as described before, particularly intended to create a stream of process gas inside the first sub-region, whereby the stream of process gas is used to guide off residues, such as smoke and smolder, created by irradiating the build material. By this embodiment, it has been recognized that it can be sufficient to only partly separate both sub-regions from each other, in particular in an area where a stream of process gas exceeds a specific value.

For example, it is suggested to only separate the first sub-region from the second sub-region from a dose module to an overflow module or in other words substantially along a build plane of the process region. Particularly, the separation can extend from the first side of the dose module which faces the build chamber or the build plane to the second side of the overflow module facing away from the build chamber or the build plane. Therefore, the separation extends from the dose module along the build plane and along the overflow module.

According to another preferred embodiment, the separation element is deformable by a movement of the tool carrier. Thus, the separation element is a merely passive element, whereby the separation element is positioned in the second position until the tool carrier is moved through the passageway deforming the separation element by its movement. The tool carrier can for example come in contact with the separation element and force the separation element by the movement to deform into the first orientation/position in which the separation element opens the passageway. Preferably, the separation element resets into the initial position, in particular the second position, as soon as the tool carrier has passed the passageway and lost contact with the separation element.

According to another preferred embodiment of the apparatus, the separation element may comprise a flexible material or may be at least partially built of a flexible material. By having a flexible or elastic component or being built of a flexible material the separation element allows for an effective deforming of the separation element by the tool carrier. Based on the flexible material the separation element is resilient to the movement of the tool carrier, whereby the wear of the separation element and the tool carrier is reduced.

The inventive apparatus can further be improved in that a shape of the tool carrier is suited or matched to a shape of at least one separation element to deform the separation element with low wear. According to this embodiment, the shape of the tool carrier can be chosen with respect to the shape of the separation element to allow for a deforming of the separation element with low wear. Therefore, the wear between the separation element and the tool carrier is reduced as the contact and the relative movement between the parts is adjusted.

Another preferred embodiment of the apparatus suggests that the tool carrier is configured to at least partly turn down or flap the separation element, in particular by moving perpendicular to a coating direction. The movement of the tool carrier against the separation element causes the separation element to at least partly turn down, whereby the passageway is opened for the tool carrier to pass. In other words, the tool carrier may deform the separation element by turning down the separation element at least partly, wherein the separation element is in the second position in its undefined state and in the first position when the tool carrier turns down the separation element.

The separation element can for example be built as or comprise a brush or there can be at least a two separation elements built as or comprising meshing brushes, wherein the tool carrier can pass through the passageway deforming the brushes. Further, the separation element can be built as or comprise a flexible profile, in particular a U-profile or there can be two separation elements which are built as or comprise flexible profiles, in particular U-profiles. The single profiles are particularly preferred arranged counter to one another.

A further embodiment of the apparatus suggests that at least one separation element is pivoted, in particular that the separation element is built as a pivotable flap. The separation element can thereby be moved between the first and the second position like a door, opening or closing the passageway dependent on the position of the separation element. Again, the movement of the separation element between the first and the second position can be driven or caused by the movement of the tool carrier.

The apparatus can further be improved in that the at least one separation element is mounted on a sucking unit configured to suck process gas from the process chamber. According to this embodiment, the separation element can be movably and/or deformably mounted on a sucking unit which creates a stream of process gas inside the process chamber, for example to guide off residues.

Besides, the invention relates to a method for operating an inventive apparatus. Self-evidently, all features, details and advantages described with respect to the inventive apparatus are fully transferable to the inventive method.

Figure 2:
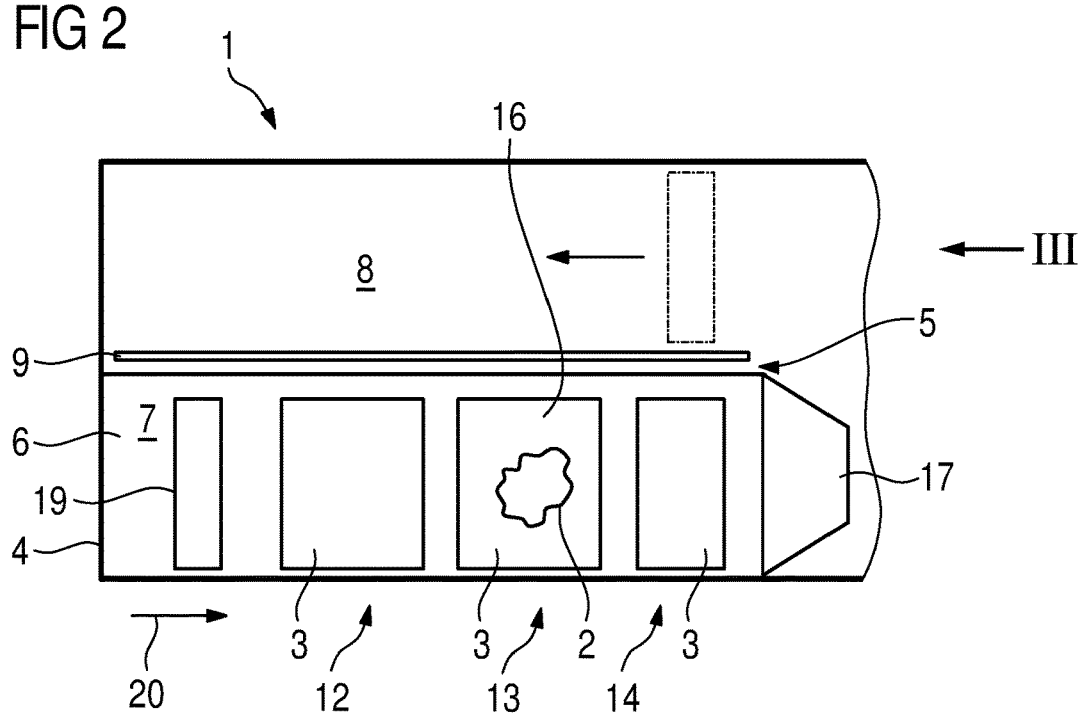
Figure 3:
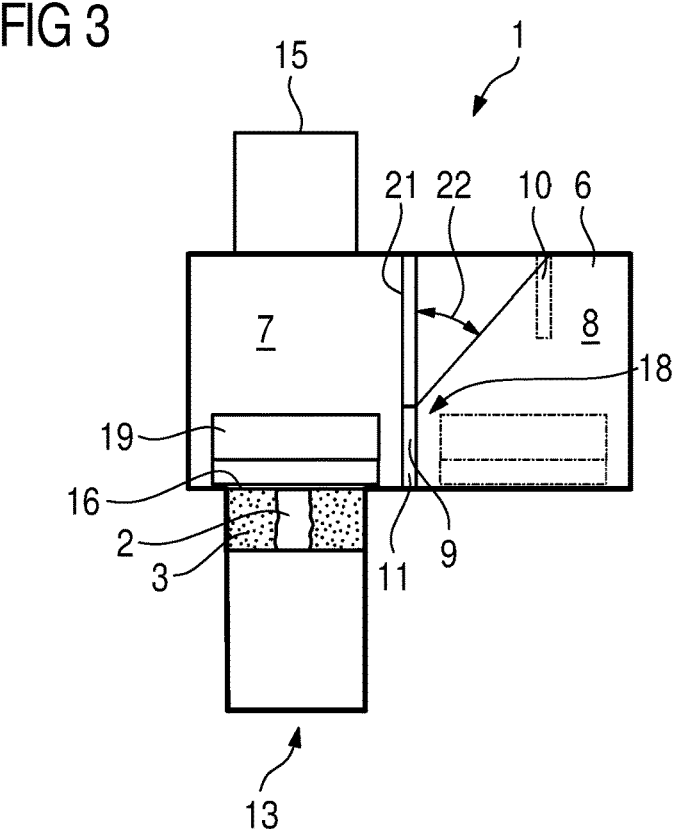
Figure 4:
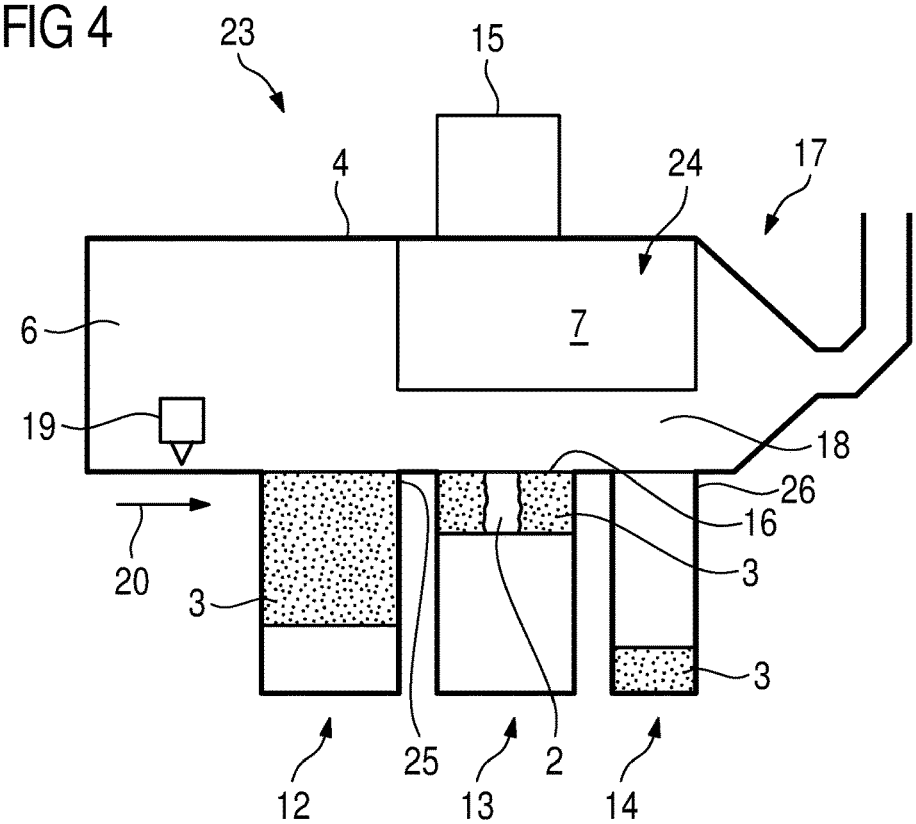
Figure 5:
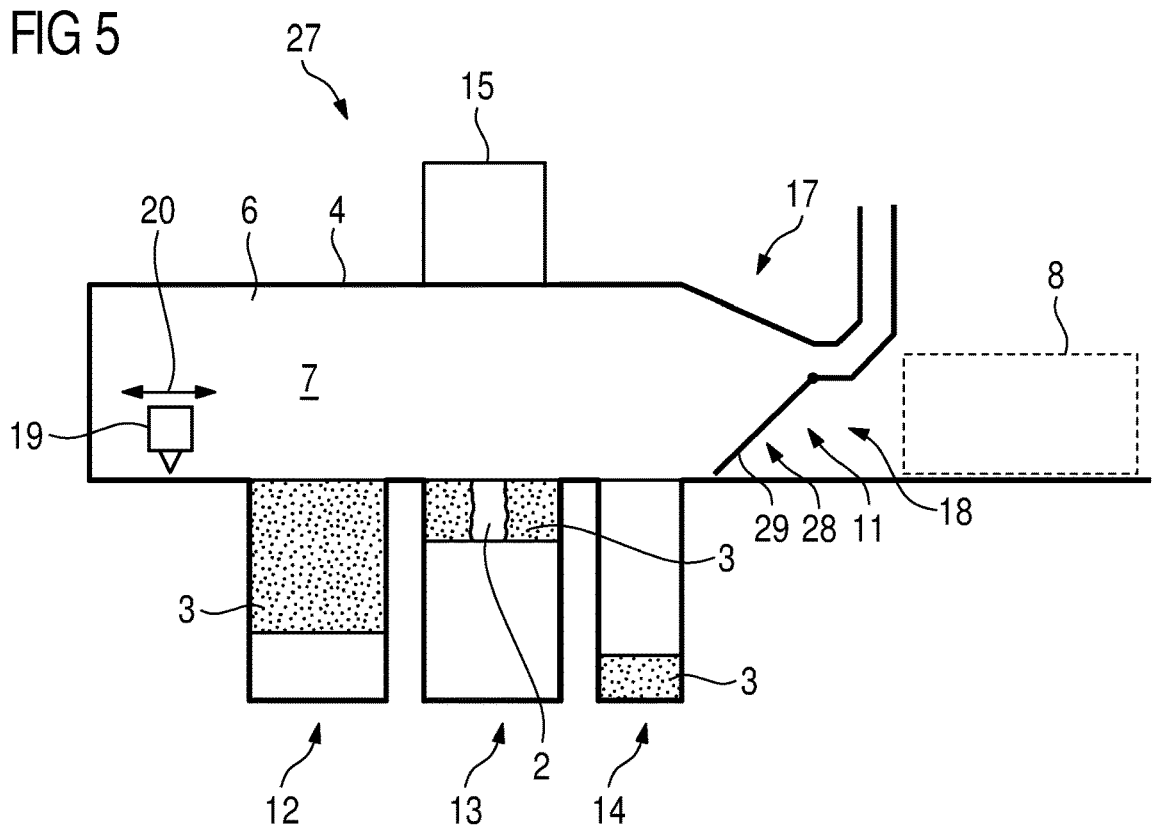
Figure 6:
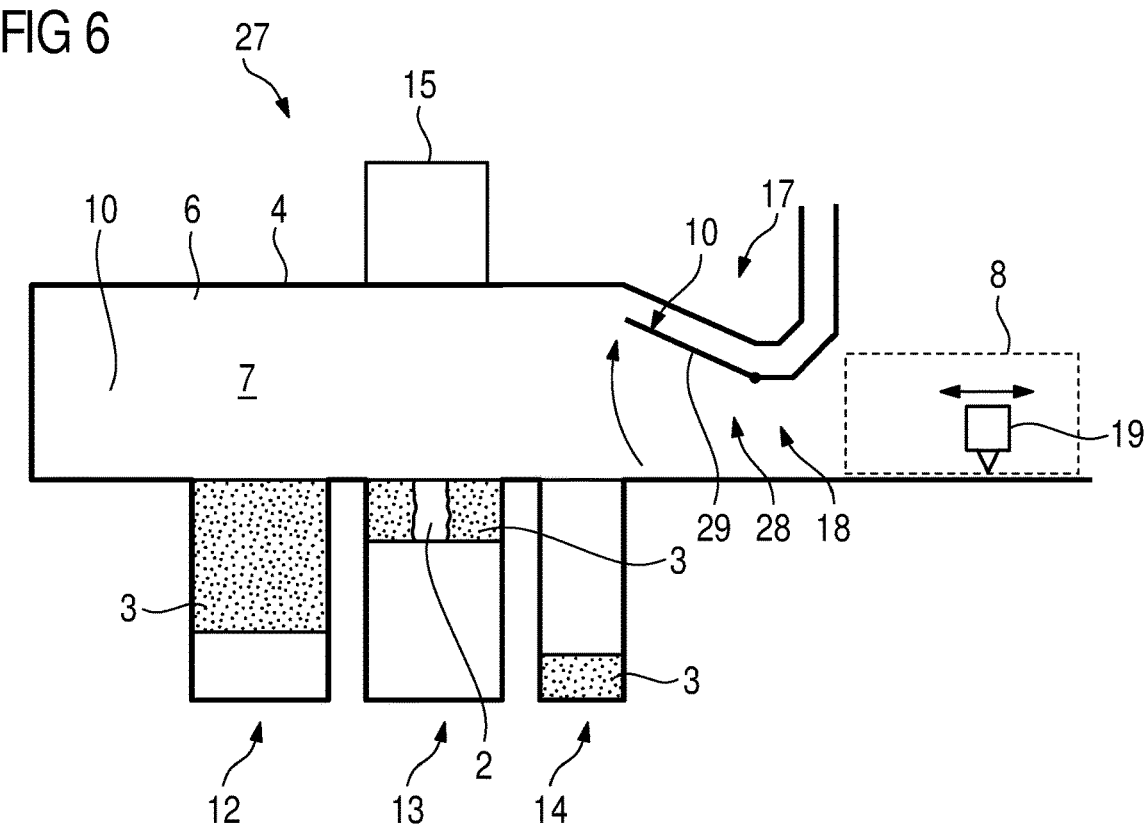

Exemplary embodiments of the invention are described with reference to the figs. The figs. are schematic views and show:

FIG. 1 an inventive apparatus according to a first embodiment in a sectional front view;

FIG. 2 the apparatus of FIG. 1 in a top view;

FIG. 3 the apparatus of FIG. 1 in a side few;

FIG. 4 an inventive apparatus according to second embodiment in a sectional front view; and FIG. 5 an inventive apparatus according to a third embodiment in a sectional front view;

FIG. 6 the apparatus according to FIG. 5; and

Figure 7:
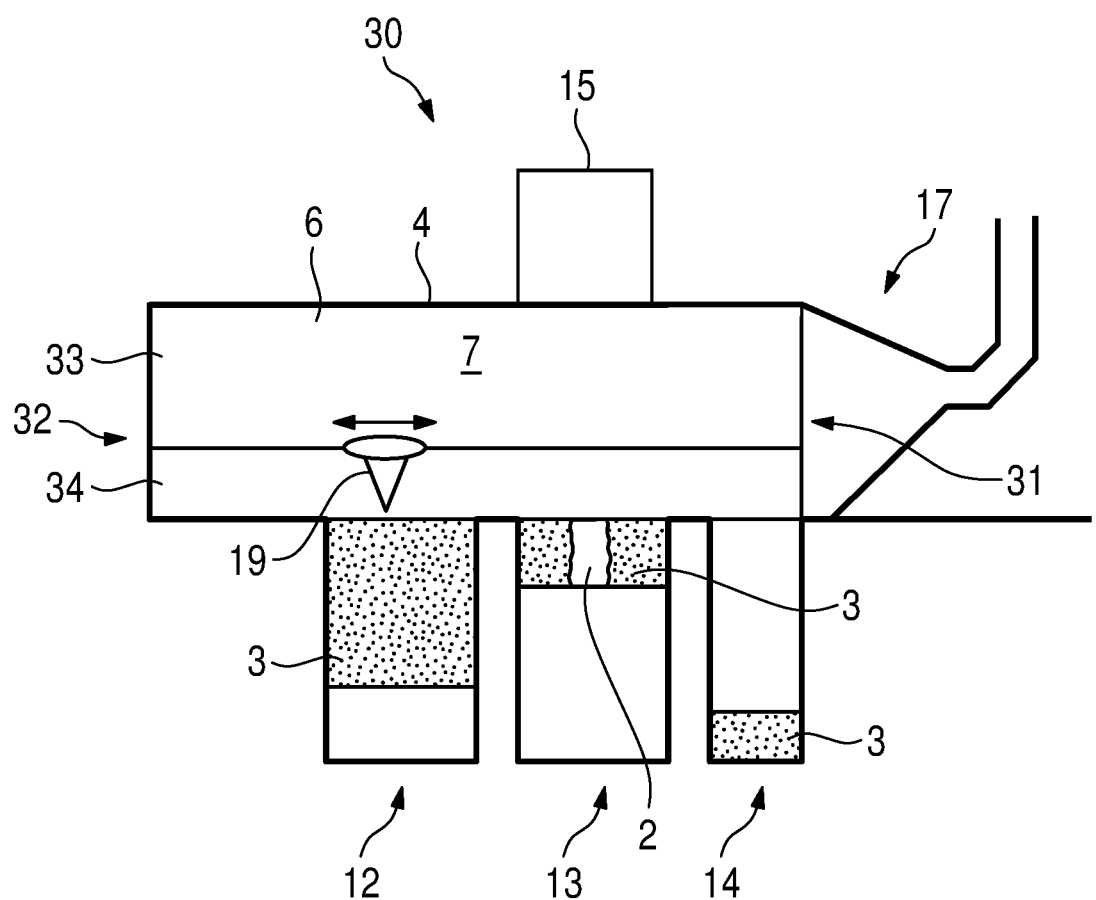

FIG. 7 element is apparatus according to a fourth embodiment in a sectional front view.

FIG. 1 shows an apparatus 1 for additively manufacturing of three-dimensional objects 2 by means of successive layerwise selective irradiation and consolidation of layers of a build material 3, for example metal or ceramic or polymer, which can be consolidated by means of an energy beam, in particular a laser beam, whereby the apparatus 1 comprises a process chamber 4 with a chamber separation device 5 separating a process region 6 into a first sub-region 7 and a second sub-region 8 (FIG. 2) of the process chamber 4. The chamber separation device 5 comprises a separation element 9 that is movable between a first position 10 (e.g. FIG. 1) and a second position 11 (FIG. 3).

The apparatus 1 further comprises a dose module 12, a build chamber 13 and an overflow module 14, whereby a beam source 15 is configured to selectively irradiate the build material 3 in the build chamber 13, wherein a build plane 16 is defined as a plane where the energy beam may selectively irradiate the build material 3 and thereby selectively consolidates the build material 3.

Further, the apparatus 1 comprises a streaming device 17 which may be built as a sucking unit and configured to create a stream of process gas inside the process chamber 6. As can be seen from FIG. 1-3, the chamber separation device 5 at least partly separates the first sub-region 7 from the second sub-region 8 and in other words divides the process region 6 into the first sub-region 7 and the second sub-region 8. As mentioned above, the separation element 9 is movable between a first position 10 and a second position 11, whereby the separation element 9 is configured to create or open a passageway 18, respectively. The passageway 18 allows for a tool carrier 19, in particular a tool carrier 19 for a coater, to pass/move from the first sub-region 7 to the second sub-region 8 or vice versa.

For example, the tool carrier 19 is moved along a coating direction 20 (depicted as an arrow) over the dose module 12, the build chamber 13 and the overflow module 14. Afterwards, the tool carrier 19 can pass in a different (transverse) direction through the passageway 18 perpendicular to the coating direction from the first sub-region 7 into the second sub-region 8. As soon as the tool carrier 19 has left the first sub-region 7, the separation element 9 can be moved from the first position 10 to the second position 11 (FIG. 3). The separation element 9 closes the passageway 18 in the second position 11 thereby, providing a plane surface 21 facing the first sub-region 7. With the separation element 9 in the second position the first sub-region 7 and the second sub-region 8 are separated, wherein the streaming device 17 is able to create a stream of process gas only inside the first sub-region 7 which allows for a more effective use of the streaming device 17.

Therefore, while the tool carrier 19 is returned via a path, essentially opposite to the coating direction 20, through the second sub-region 8 the separation element 9 is placed in the second position 11 separating both sub-regions 7, 8. Thus, the irradiation of build material 3 through the energy beam can be executed while the tool carrier 19 is returned through the second sub-region 8. While irradiating the build material 3 residues are produced which can be guided off by the streaming device 17.

As the exposure or irradiation is finished, the separation element 9 can be moved from the second position 11 to the first position 10 thereby opening the passageway 18 and allowing for the tool carrier 19 to return from the second sub-region 8 into the first sub-region 7 for example into the position shown in FIG. 2. The separation element 9 preferably is moved under an angle 22, for example 7°.

FIG. 4 shows an apparatus 23 according to a second embodiment. The fundamental assembly of the apparatus 23 is equivalent to the apparatus 1 shown in the FIGS. 1-3, wherefore same numerals are used for same parts of the apparatus 23. The apparatus 23 deviates from the apparatus 1 in the construction of a chamber separation device 24, as the chamber separation device 24 and the corresponding separation element 9 extend partly through the process region 6 and therefore, only separate a part of the process region 6 into a first sub-region 7 and a second sub-region 8. The function of the separation element 9 is the same as in the apparatus 1.

In the embodiment shown in FIG. 4, the chamber separation device 24 divides the process region 6 starting from a first side 25 of the dose module 12 facing the build chamber 13 and extends to a second side 26 of the overflow module 14 facing away from the build chamber 13. The area between side 25 and side 26 contains the predominant movement of process gas, wherein in the area left of side 25 the movement of process gas is insignificant. The residues created through the energy beam are also predominantly created above the build plane 16 and are guided of via the streaming device 17 to the right, whereby only negligible movement of process gas and therefore, transport of residues is induced in the area left of the side 25.

The fundamental function of the apparatus 23, in particular the chamber separation device 24 is analog to the apparatus 1. Therefore, regarding the function of the chamber separation device 24 reference is made to the description relating to the FIGS. 1-3. In particular, the chamber separation device 24 also comprises a separation element 9 which is movable between a first position 10 and a second position 11. The length of the separation element 9 thereby matches the length of the chamber separation device 24.

FIGS. 5 and 6 show an apparatus 27 according to a third embodiment of the invention. The apparatus 27 is built substantially similar to the apparatuses 1 and 23 described before with respect to the FIGS. 1-4. Thus, the same numerals are used for same parts and reference is made to the respective parts of the description.

The apparatus 27 deviates from the apparatuses 1 and 23 in the design of the chamber separation device 28. In FIG. 5, 6, the chamber separation device 28 comprises a separation element 29 which is movable between a first position 10 (shown in FIG. 6) and a second position 11 (shown in FIG. 5). The separation element 29 thereby opens and closes the passageway 18 that links the first sub-region 7 and the second sub-region 8. According to this embodiment of the invention the second sub-region 8 can also be described as a tool change area.

As can be seen from the FIGS. 5 and 6, the separation element 29 is built as a pivoted flap which is mounted to the streaming device 17. Therefore, the tool carrier 19 can move inside the process region 6, in particular inside the first sub-region 7 and can be moved over the dose module 12, the build chamber 13 and the overflow module 14. Further, the tool carrier 19 can pass through the passageway 18, if the separation element 29 is in the first position 10 allowing for the tool carrier 19 to be moved from the first sub-region 7 into the second sub-region 8.

FIG. 7 shows an apparatus 30 according to a fourth embodiment of the invention. The apparatus 30 is built analogously to the apparatuses 1, 23 and 27 described before, wherefore same numerals are used for same parts and reference is made to the description of the basic function of the apparatuses 1, 23 and 27 as described before.

The apparatus 30 deviates from the apparatuses 1, 23 and 27 described before in a chamber separation device 31 comprising a separation element 32. The separation element 32 is built of a flexible material, wherein a first sub element 33 extends vertically from a top of the process chamber 4 and a second sub element extends vertically from the bottom of the process chamber 4, wherein the first and the second sub elements 33, 34 are arranged one counter the other.

The tool carrier 19 can be moved along the coating direction 20, whereby a movement of the tool carrier 19 causes both sub elements 33 and 34 to deform, thereby creating a slit between both sub elements 33, 34. As can further be seen from FIG. 7 the sub elements 33, 34 fit closely to the tool carrier 19 and separate the sub-regions 7, 8 from each other. Further, the shape of the tool carrier 19 is configured to deform the sub elements 33, 34 of the separation element 32 with low wear.

Therefore, the edges of the tool carrier 19 mesh with low friction with the sub elements 33, 34. The sub elements 33, 34 further create a passageway 18 for the tool carrier 19 as the movement of the tool carrier 19 causes the sub elements 33 and 34 to deform or to turn over, respectively, allowing for the tool carrier 19 to move from the second sub-region 8 into the first sub-region 7 and vice versa. To change between the first and the second sub-region 7, 8, the tool carrier 19 is moved substantially perpendicular to the coating direction 20 and thereby, turns over the sub elements 33, 34. Again, the chamber separation device 31 separates the process region 6 into the first sub-region 7 and the second sub-region 8, as described before, wherein the tool carrier 19 is returned via a path, essentially opposite to the coating direction 20, through the second sub-region 8 while the beam source 15 creates an energy beam irradiating the build material 3 on the build plane 16 selectively. The residues created due to the irradiation are guided of via the streaming device 17.

The tool carrier 19 can afterwards, be returned to its initial position by turning over the sub elements 33, 34 and thereby passing through the passageway 18 deforming of the sub elements 33 and 34.

Of course, every aspect and detail of the apparatuses 1, 23, 27 and 30 can arbitrarily be exchanged and transferred to each other.

The invention claimed is:

1. An apparatus for additively manufacturing three-dimensional objects, the apparatus comprising:
 a process chamber defining a process region, the process chamber configured for successive layerwise selective irradiation and consolidation of layers of a build material with an energy beam;
 a build chamber;
 a dose module configured to provide build material to the build chamber;
 an overflow module configured to receive excess build material having been provided to the build chamber;
 a tool carrier disposed within the process chamber;
 a streaming device configured to generate at least one stream of process gas; and
 a chamber separation device separating the process region into a first sub-region and a second sub-region, the chamber separation device comprising at least one separation element, respective ones of the at least one separation element being movable, at least partially in a vertical direction relative to a vertical axis, between a first position and a second position, the first position providing a passageway allowing access for the tool carrier to move from the first sub-region at least partially into the second sub-region, and the second position separating the second sub-region from the at least one stream of process gas flowing through the first sub-region, wherein the first sub-region extends over the build chamber, the dose module, and the overflow module with the at least one separation element in the second position.

2. The apparatus of claim 1, wherein the at least one separation element is moveable with respect to either a position or a movement of the tool carrier.

3. The apparatus of claim 1, wherein the tool carrier comprises a carrier for a coater.

4. The apparatus of claim 1, wherein the at least one chamber separation device provides a smooth surface facing the process region with the at least one separation element in the second position.

5. The apparatus of claim 1, wherein the at least one separation element is vertically moveable at an oblique angle relative to the vertical axis.

6. The apparatus of claim 1, wherein the at least one separation element is configured in at least one position to only partly separate the second sub-region from the at least one stream of process gas flowing through the first sub-region.

7. The apparatus of claim 1, wherein:
the dose module comprises a first sidewall facing the build chamber;
the overflow module comprises a second sidewall facing the build chamber; and
the first sub-region extends laterally above a build plane defined by a successive layer of build material in the build chamber, substantially from the first sidewall to the second sidewall.

8. The apparatus of claim 1, wherein the at least one separation element is deformable by a movement of the tool carrier.

9. The apparatus of claim 1, wherein the at least one separation element comprises a flexible material or is at least partially built of a flexible material.

10. The apparatus of claim 1, wherein a shape of the tool carrier is suited to a shape of a corresponding one of the at least one separation element.

11. The apparatus of claim 1, wherein the tool carrier is configured to at least partly turn down a corresponding one of the at least one separation element by moving perpendicular to a coating direction.

12. The apparatus of claim 1, wherein the at least one separation element is pivotable or is built as a pivotable flap.

13. The apparatus of claim 12, comprising:
a sucking unit configured to suck process gas from the process chamber, the at least one separation element being mounted to the suction unit.

14. A method for operating an apparatus of claim 1 comprising:
irradiating and consolidating a first layer of build material in a build chamber within the first sub-region of the process chamber with the chamber separation device in the second position;
supplying, with a streaming device, a stream of process gas through the first sub-region of the process chamber with the chamber separation device in the second position;
moving the chamber separation device, at least partially in a vertical direction relative to a vertical axis, from the second position to the first position;
moving the tool carrier from the second sub-region at least partially into the first sub-region and the back into the second sub-region;
moving the chamber separation device, at least partially in a vertical direction relative to a vertical axis, from the first position to the second position;
providing, with a dose module within the first sub-region of the process chamber with the chamber separation device in the second position, build material to the build chamber;
irradiating and consolidating a second layer of build material within the first sub-region of the process chamber; and
receiving, with an overflow module within the first sub-region of the process chamber with the chamber separation device in the second position, excess build material having been provided to the build chamber.

15. The method of claim 14, wherein the at least one separation element is moveable with respect to either a position or a movement of the tool carrier.

16. The method of claim 14, wherein the tool carrier comprises a carrier for a coater.

17. The method of claim 14, wherein the at least one chamber separation device provides a smooth surface facing the process region with the at least one separation element in the second position.

18. The method of claim 14, wherein the at least one separation element is vertically moveable at an oblique angle relative to the vertical axis.

19. The method of claim 14, wherein the process chamber comprises:
a first sidewall of the dose module, the first sidewall facing the build chamber; and
a second sidewall of the overflow module, the second sidewall facing the build chamber;
wherein the first sub-region extends laterally above a build plane defined by a successive layer of build material in the build chamber, substantially from the first sidewall to the second sidewall.

* * * * *